V. ROYLE.
DISCHARGE NOZZLE OR FORMER OF TUBE MAKING MACHINES.
APPLICATION FILED DEC. 7, 1904.

906,297.

Patented Dec. 8, 1908.

Witnesses:
F. George Barry
Henry Thieme

Inventor:
Vernon Royle
by attorneys
Brown Seward

UNITED STATES PATENT OFFICE.

VERNON ROYLE, OF PATERSON, NEW JERSEY.

DISCHARGE-NOZZLE OR FORMER OF TUBE-MAKING MACHINES.

No. 906,297.     Specification of Letters Patent.     Patented Dec. 8, 1908.

Application filed December 7, 1904. Serial No. 235,817.

*To all whom it may concern:*

Be it known that I, VERNON ROYLE, a citizen of the United States, and resident of Paterson, in the county of Passaic and State of New Jersey, have invented a new and useful Discharge-Nozzle or Former of a Tube-Making Machine, of which the following is a specification.

Figure 1:
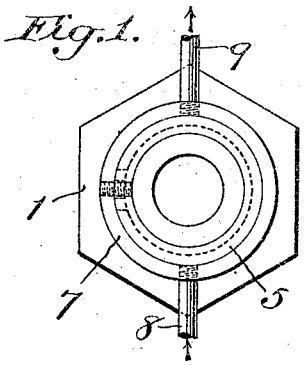
Figure 2:
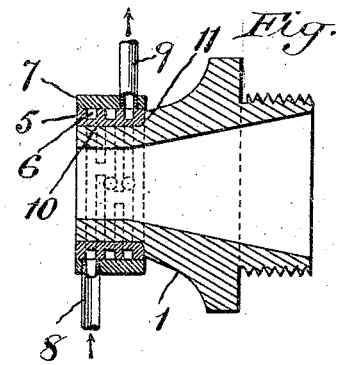
Figure 3:
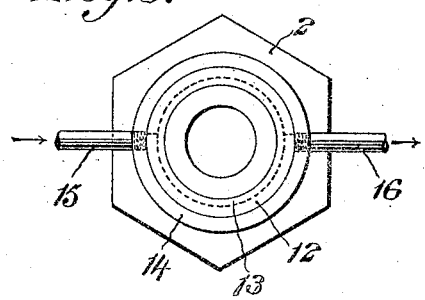
Figure 4:
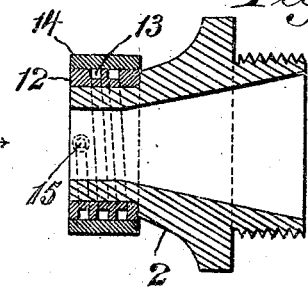
Figure 5:
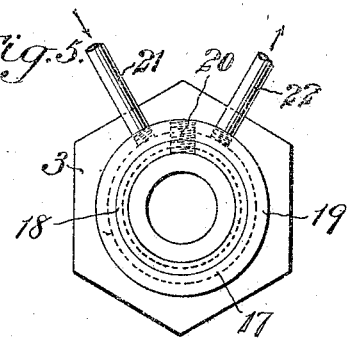
Figure 6:
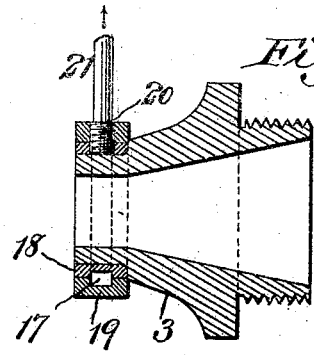

My invention relates to the discharge nozzle or former of a tube making machine and particularly to nozzles or formers used in connection with machines where it is desirable to keep the plastic material in a heated condition as it escapes from the nozzle or former.
In the accompanying drawings, Figure 1 is an end view of a nozzle or former showing the heating apparatus adjusted thereon as in use, Fig. 2 is a longitudinal central section of the same, Fig. 3 is an end view of a modified form, Fig. 4 is a longitudinal central section of the same, Fig. 5 is an end view of a second modification, and Fig. 6 is a longitudinal central section of the same.

The nozzle or former is denoted in Figs. 1 and 2 by 1; in Figs. 3 and 4 by 2; and in Figs. 5 and 6 by 3. In each of the several figures the interior of the nozzle or former is of substantially the same size and shape and is intended to include any size or shape which may be required for giving to the tube to be formed of plastic material pressed through the nozzle the size and exterior shape required. On its exterior, the nozzle is modified to suit the particular form of channel ring which is to be applied thereto.

In Figs. 1 and 2 the channel ring employed is formed of two parts, one part denoted by 5 being provided in its exterior face with a series of annular grooves 6 which are closed on their outer faces by means of an outer annular part 7 which is intended to slide with a close machine fit over the part 5. In the present instance three annular grooves 6 are shown and adjacent grooves are connected by transverse ports so that a heating fluid, admitted through the pipe 8 to the outer groove of the series, will travel around the outer groove; thence into the next succeeding groove, through a transverse port, and, after passing around the second groove into a succeeding groove, through a transverse port and finally pass out through an exit pipe 9.

The free end of the nozzle 1 is turned down, forming a seat 10 for the reception of the inner part 5 of the sectional channel ring which may be slipped over the end of the nozzle until it abuts against a shoulder 11 thereon.

In the form shown in Figs. 3 and 4 the channel ring is, like that shown in Figs. 1 and
2, formed in two parts, an inner and outer, but the inner part, denoted by 12, instead of being provided with annular grooves in its surface is provided with a spiral groove 13 closed at its outer face by the outer part 14. The heating fluid is admitted to this spiral groove through a pipe 15 and is discharged through a pipe 16, these two pipes communicating one with one end of the spiral groove and the other with the opposite end.

In the form shown in Figs. 5 and 6 the channel ring is still shown as formed of two parts but there is a single annular channel 17 formed partly in the exterior of the inner part 18 and partly in the inner face of the exterior part 19. The annular channel 17 is interrupted at a point, in the present instance by a screw plug 20, and the heating fluid is admitted to the channel by an inlet pipe 21 communicating with the channel at one side of the plug 20 and is discharged through a pipe 22 connecting with the channel on the opposite side of the plug 20.

In all of the forms shown the channel ring is so located with respect to the nozzle as to distribute the heating fluid around the nozzle in intimate relation thereto so as to keep the nozzle heated to such a degree as may be desired to keep the elastic material in its soft, pliable condition and, at the same time, the structure is such that the channel ring for directing the heating fluid around the nozzle may be removed from the nozzle whenever it is not found necessary to heat the material therein and this removal and adjustment of the channel ring may be accomplished in a most expeditious and simple manner by sliding the ring off and sliding it on.

It is obvious that the channel, for example the channel 17, might be formed wholly in the exterior face of the nozzle and closed by simply slipping a plain ring over it if so desired.

What I claim is:—

1. The combination with the nozzle or former of a tube making machine, of a ring composed of an inner section and an outer section superposed on the inner section, the said ring being provided with an annular channel and fitted to surround the end of the nozzle or former and means for admitting a heating fluid into and discharging it from the said ring.

2. The combination with the nozzle or former of a tube making machine, of a two-part ring composed of outer and inner sections, the inner part being fitted to slide on and off the end of the nozzle and having a channel in its outer face and the outer part of the ring being fitted to surround the inner part and form the outer wall of the channel and means for admitting a heating fluid to and discharging it from the said channel.

In testimony, that I claim the foregoing as my invention, I have signed my name in presence of two witnesses, this 17th day of November 1904.

VERNON ROYLE.

Witnesses:
FREDK. HAYNES,
HENRY THIEME.